United States Patent [19]

Tomori et al.

[11] 4,400,075
[45] Aug. 23, 1983

[54] AUTOMATIC FOCUS CAMERA WITH INTERCHANGEABLE LENS

[75] Inventors: Yasumasa Tomori, Sakado; Mituhiko Shimoda, Asaka, both of Japan

[73] Assignee: Asahi Kogaku Kogyo Kabushiki Kaisha, Tokyo, Japan

[21] Appl. No.: 298,170

[22] Filed: Aug. 31, 1981

[30] Foreign Application Priority Data

Sep. 10, 1980 [JP] Japan .............................. 55-125543
Jan. 21, 1981 [JP] Japan .............................. 56-7218[U]

[51] Int. Cl.$^3$ .......................... G03B 3/10; G03B 13/02
[52] U.S. Cl. ...................................... 354/195; 354/286
[58] Field of Search ................. 354/25, 195, 286, 266

[56] References Cited

U.S. PATENT DOCUMENTS 4,323,303 4/1982 Enomoto .......................... 354/286

FOREIGN PATENT DOCUMENTS 3120911 3/1982 Fed. Rep. of Germany ...... 354/286

Primary Examiner—Russell E. Adams
Attorney, Agent, or Firm—Merchant, Gould, Smith, Edell, Welter & Schmidt

[57] ABSTRACT

An automatic focus camera with an interchangeable lens, comprising an interchangeable lens barrel having focussing lens means, a camera body having a focus detecting device, the lens barrel having a driving motor for axially moving the focussing lens means in accordance with a detection signal of the focus detecting device, switch circuit means on the camera body for actuating the focus detecting device and the driving motor, and external actuation switches on the lens barrel for actuating the focus detecting device and the driving motor, independently of the actuation of the switch circuit means.

19 Claims, 12 Drawing Figures

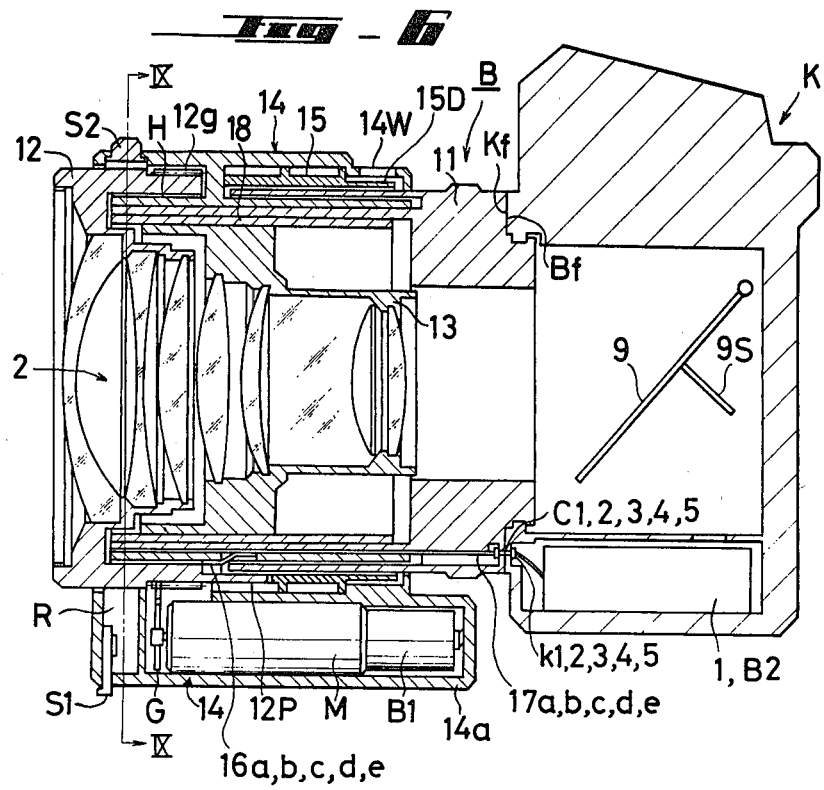
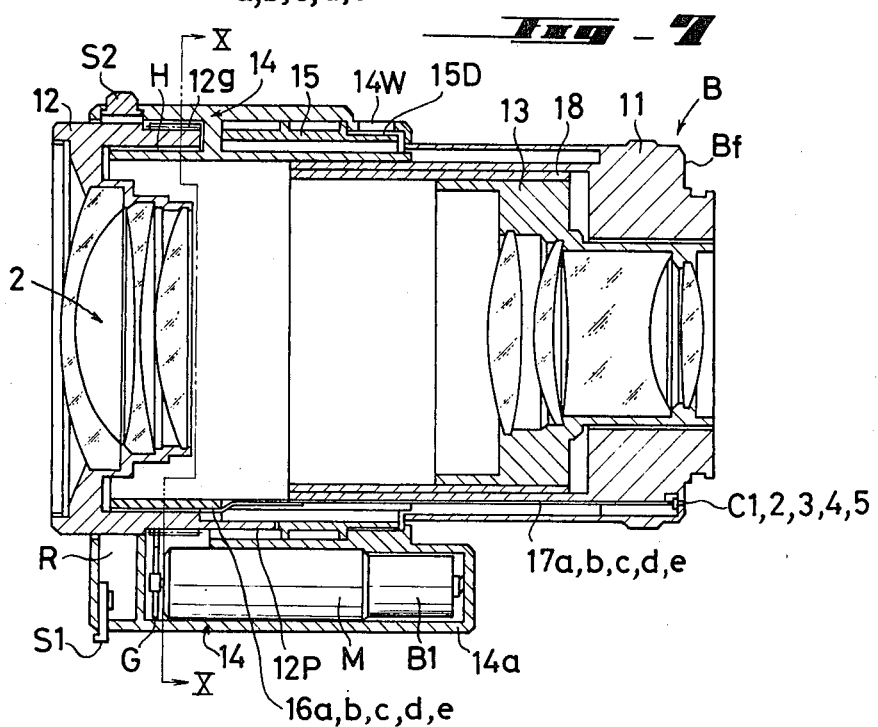

AUTOMATIC FOCUS CAMERA WITH INTERCHANGEABLE LENS

This invention relates to an automatic focus camera with an interchangeable lens, and in particular to a single-lens reflex camera.

There is known an automatic focus camera in which focussing lens means is driven by a driving motor provided in an interchangeable lens barrel, and a focus detecting device is provided in a camera body, for detecting the focal point of the focussing lens means to move the latter in order to focus image on the focal plane, i.e., on the film plane. The drive signal from the focus detecting device is fed to the driving motor for the focussing lens means, so that automatic focussing can be effected.

The focus detecting device and the driving motor must be driven before the release of a shutter of a camera body is effected. For this purpose, a switch circuit is provided, which is associated with a shutter release button so that the focus detecting device and the driving motor are driven prior to the release of the shutter. Such an association of the switch circuit with the shutter release button contributes to the provison of a so-called fool-proof camera and is simplest to operate the fool-proof camera.

However, in a single-lens reflex camera with an interchangeable lens, not only a standard lens or a wide-angle lense, but also a telephoto lens with a small depth of focus or a zoom lens with a variable focal distance can be selectively used. In these lenses, since they have a small depth of focus, it is necessary to first adjust the focus in accordance with an object and then release the shutter. These two operations can be effected also in a conventional camera in which the switch circuit is associated with the release button, in such a way that the release button is pushed by one step to achieve an automatic focussing and then further pushed by two steps to release the shutter. In particular, when only an automatic focussing is effected, it is necessary to keep the release button in a position in which it is pushed only by one step. However such a position is unstable and may cause the release button to be accidentally further pushed so that the shutter can be actuated prior to an optimum shutter chance.

Apart from the above discussion, a conventional camera in which automatic focussing and shutter releasing can be both effected only by a shutter release button of a camera body has a disadvantage in that it cannot be easily and simply operated.

The primary object of the present invention is, therefore, to provide an automatic focus camera in which an automatic focussing mechanism can be operated by a switch means different from a shutter release button.

Another object of the present invention is to provide a camera in which an automatic focussing mechanism can be driven independently by either a switch means on a camera body or a switch means on a lens barrel.

Still another object of the present invention is to provide a camera in which an automatic focussing circuit can be automatically completed when an interchangeable lens barrel is mounted to a camera body so that automatic focussing signals can be transmitted from the camera body to the lens barrel and vice versa, without any connecting cable.

According to the present invention, in order to achieve the objects mentioned above, switch circuites or external actuation switch means are provided not only on a camera body, but also on an interchangeable lens barrel to operate an automatic focussing mechanism, so that the latter can be actuated either by the switch on the camera body or by the switch on the lens barrel. Furthermore, according to the present invention, focussing signal transmitting and receiving means are provided on detachable mounts of the camera body and of the interchangeable lens barrel so that when the latter is mounted to the camera body, the focussing signal transmitting and receiving means on the camera body and on the lens barrel can be automatically and electrically connected to each other.

The external actuation switch means on the interchangeable lens barrel includes, for example, a power supply switch of the driving motor for the focussing lens means and an actuation switch of the focus detecting means of the camera body. The two switches always simultaneously turn ON and OFF to make the focussing mechanism operative and inoperative.

Alternatively, it is also possible to provide a external actuation switch which directly makes only a power supply switch ON which in turn makes a semiconductor switch circuit ON to operate the focus detecting device. The semiconductor switch circuit simplifies the construction of the external actuation switch of a lens barrel.

The invention will be discussed below in detail, with reference to the accompanying drawings in which;

FIGS. 6 and 7 are longitudinal sectional views of a camera according to the present invention, shown in different positions;

FIG. 8 is an elevational view of a camera body;

Figure 1:
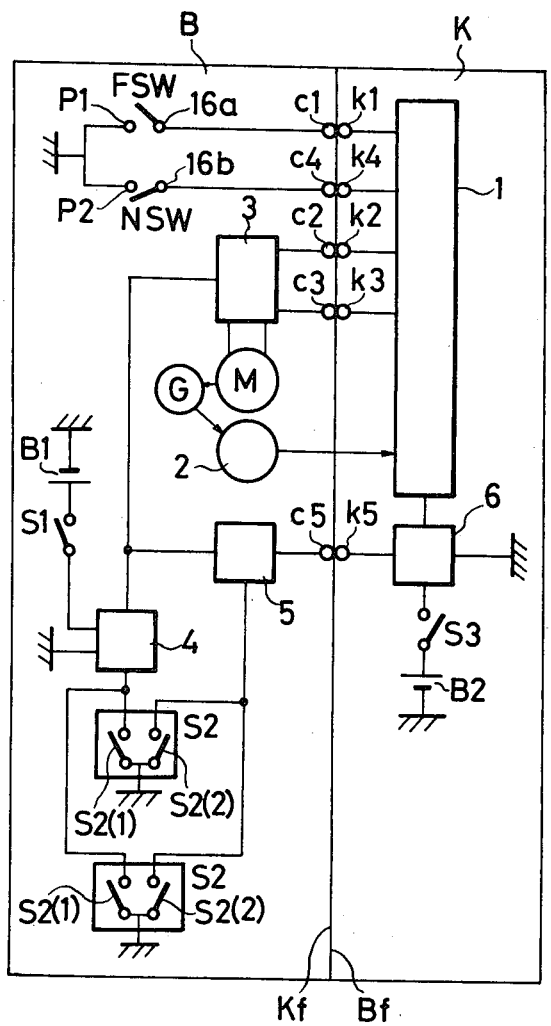
FIG. 1 shows an electrical connection of a circuit in a camera with an interchangeable lens, according to the present invention.
Figure 2:
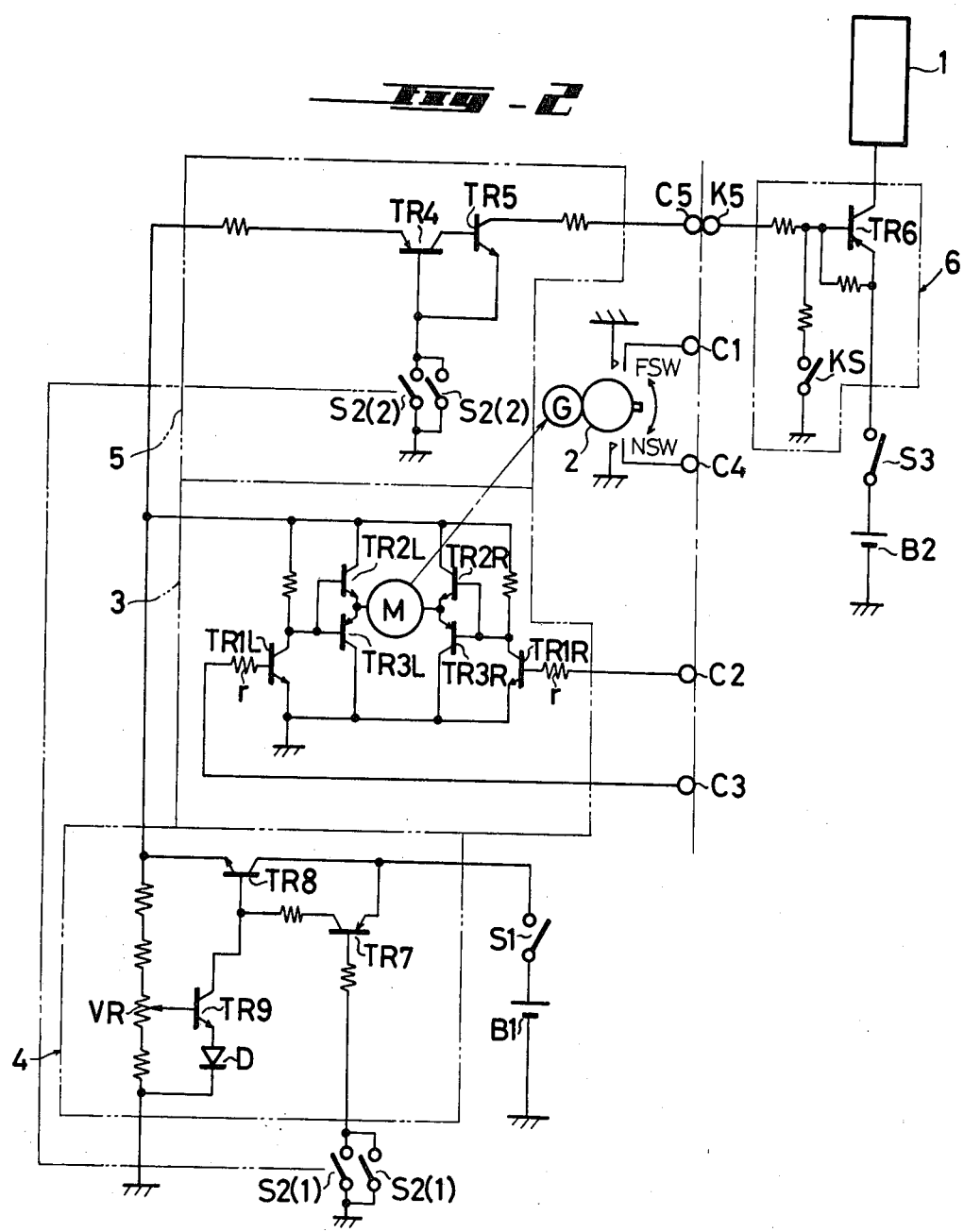
FIG. 2 shows an example of circuit elements shown in FIG. 1, such as a motor driving and reversing circuit, a circuit for controlling the number of revolution of a motor, a barrel switch circuit, a camera switch circuit, and circuits associated with the above mentioned circuits.
Figure 3:
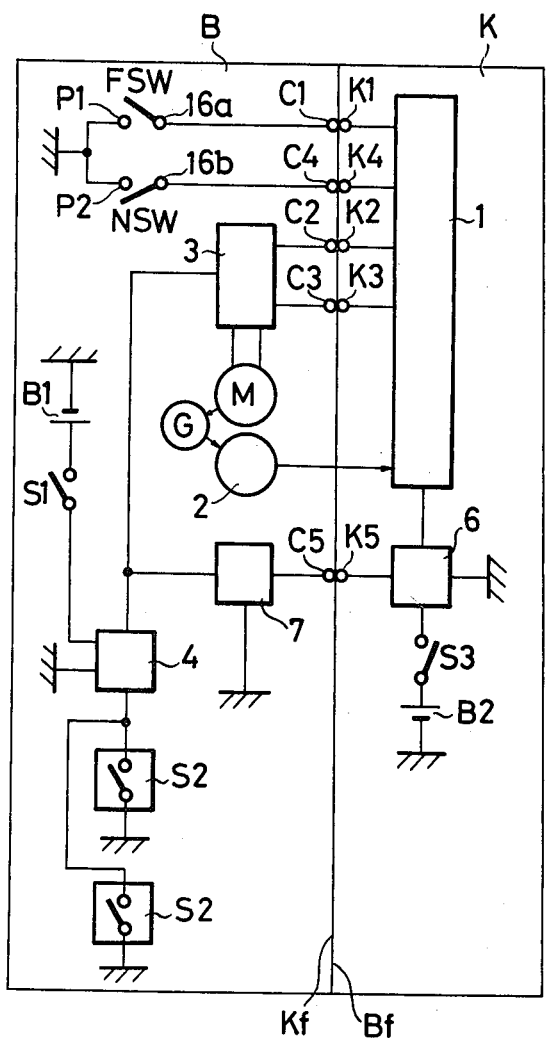
FIG. 3 shows another embodiment of FIG. 1.

FIG. 1 shows an electrical connection between a camera body K and a lens barrel B of an automatic focussing camera according to the present invention. The camera body K has therein a focus detecting device 1 which detects an image of an object formed by a focussing lens means 2 of the lens barrel B and causes the focussing lens means to be selectively displaced forwards or backwards in axial directions in order to obtain an focussed image on a focal point of the camera. The focus detecting device 11 is per se known and is disclosed for example in U.S. Pat. No. 4,045,804. The present invention is not directed to the construction of the focus detecting device. "M" and "G" on the lens barrel B designate a driving motor and a driving mechanism, of the focussing lens means 2, respectively. A motor driving and reversing circuit 3 (FIG. 2) has a bridge circuit per se known for selectively driving or reversing the motor M in accordance with signals transmitted from the focus detecting device 1 to the circuit 3 through terminals K2 and K3 on the camera body K and terminals C2 and C3 on the lens barrel, respectively. The circuit 3, as shown in FIG. 3 includes symmetrically arranged transistors TR1R, TR1L, transistors TR2R, TR2L, and TR3R, TR3L, between the terminals C2 and C3, each of the transistors TR1R and TR1L having a protecting resistor r.

When a high voltage is applied to the terminal C2, on one hand, the transistors TR1R and TR3R are turned On and the transistor TR2R is turned OFF, and, on the other hand, the transistors TR1L and TR3L are turned OFF and the transistor TR2L is turned ON, so that a high voltage substantially equal to that of the battery B1 is applied to a terminal on the left hand side of the motor M, resulting in the direct rotation of the motor M.

It can be easily understood, in view of the symmetrical arrangement of the transistors, that when a high voltage is applied to the terminal C3, the motor M is reversed. When there is no difference of potential between the terminals C2 and C3, the motor M does not rotate.

The terminals K1-K5 and C1-C5 are provided on mount flange surfaces Kf and Bf of the camera body K and the lens barrel B, respectively. The focus detecting device 1, the exposure controlling battery B2 and the main switch S3 of the battery B2 are all provided on the camera body K.

The battery B1 of the driving motor M is provided on the lens barrel and is connected to a main switch S1. The battery B1 is connected to the motor driving and reversing circuit 3 through a control circuit 4 of the number of revolution of the motor M which is, in turn, connected to a camera switch circuit 6 of the camera body K through a barrel switch circuit 5, the terminals C5 and K5.

Preferably, two external actuation switches S2 spaced at for example 90° on the periphery of the lens barrel B are provided in the two circuits connecting the control circuit 4 and the barrel switch circuit 5, respectively. Each external actuation switch S2 consists of a power supply switch S2(1) of the motor M and actuation switch S2(2) of the focus detecting circuit 1 both of which are simultaneously turned ON and OFF. The switches S2(1) and S2(2) are grounded at their one end and are connected to the control circuit 4 and the barrel switch circuit 5, respectively. When the power supply switches S2(1) are made ON, the drive voltage is supplied to the motor M through the control circuit 4 which is illustrated in FIG. 2. When the actuation switches S2(2) are made ON, they make transistors TR4 and TR5 of the barrel switch circuit 5 ON and make also a transistor TR6 of the camera switch circuit 6 ON, by means of the terminals C5 and K5, so that the focus detecting device 1 operates.

The control circuit 4 shown in FIG. 2 has a voltage regulating circuit including a switching transistor TR7 which is turned ON when the power supply switches S2(1) are made ON, regulating transistors TR8 and TR9 which keep the output voltage constant when the potential of the battery B1 varies and which regulate the output voltage itself, a constant potential diode D, and variable resistor VR. In this circuit, when the potential of the battery is deviated from a reference potential determined by the diode D, the base voltage of the transistor TR9 varies and accordingly the base voltage of the transistor TR8 varies so that the output voltage thereof is constant. That is, when the potential of the battery B1 becomes higher (or lower) so that the emitter voltage increases (or decreases), the base voltage of the transistor TR9 increases (or decreases), and, accordingly, the internal resistance thereof decreases (or increases). Consequently, the base voltage of the transistor TR8 decreases (or increases) and the internal resistance thereof increases (or decreases), so that the emitter voltage of the transistor TR8 can be prevented from increasing (or decreasing).

The base voltage of the transistor TR9 can be varied by means of the variable resistor VR to control the internal resistance of the transistors TR9 and TR8 in order to adjust the emitter voltage of the transistor TR8, so that the voltage supplied to the motor M is varied to adjust the number of revolution of the motor M.

The circuit 4 is not limited to the illustrated embodiment but can be replaced by a proper circuit per se known.

In FIG. 1, switches FSW and NSW connected to the terminals C1 and C4 of the lens barrel, respectively are adapted to detect a rear end position (infinite object distance position) and a front end position (shortest object distance position) of the focussing lens means 2, respectively. The detection signals of the switches FSW and NSW are fed back to the focus detecting device 1 to achieve an accurate focussing.

When the lens barrel B is mounted to the camera body K, the terminals C1-C5 on the lens barrel are automatically connected to the corresponding terminals K1-K5 on the camera body K, as shown in FIG. 1, so that a focussing control system of the focussing lens means 2→the focus detecting device 1→the bridge circuit 3→the driving motor M→the driving mechanism G→the focussing lens means 2 can be formed.

When the main switch S1 on the lens barrel B and the main switch S3 on the camera body K are both turned ON, so that the electric power can be fed to the focus detecting device 1 and the drive motor M, and when the switch KS of the camera switch circuit 6 is turned ON, the transistor TR6 is made ON to operate the focus detecting device 1 and thus focussing can be effected by the focussing lens means, as mentioned above.

It should be noted that FIG. 1 illustrates only a main part of the present invention and a voltage supply circuit for feeding the power to the motor M when the switch circuit 6 on the camera body K is actuated is not illustrated in FIG. 1. In fact, the camera switch circuit 6 is associated with a shutter release button (not shown) in such a way that the switch KS is turned ON before the shutter is released. That is, the release button is pushed by one step to effect the focussing operation and is further pushed by two steps to release the shutter.

When the external actuation switch S2 of the lens barrel B is turned ON without actuating the camera switch circuit 6 on the camera body K, the power supply switch S2(1) of the driving motor M is turned ON so that the battery voltage is applied to the driving motor M and at the same time the actuation switch S2 (2) is made ON. Consequently, the focus detecting device 1 is actuated by means of the barrel switch circuit 5, the terminals C5 and K5, and the camera switch circuit 6. Therefore, an operator who takes a photograph first pushes the external actuation switch S2 to focus the camera in accordance with an object after a composition is determined and then pushes the shutter release button of the camera body to operate the shutter. Thus, the efficiency of operation of a camera increases. In the illustrated embodiments, a mechanical shutter is intended to be used as a shutter of a camera body, and accordingly the shutter releasing must be effected on the camera body side. However, if an electrical shutter is used, the operation signal for actuating the shutter can be fed from the lens barrel side. In this case of the electrical shutter, the external actuation switch S2 is preferably in the form of a two-step type actuation switch which effects an automatic focussing when it is pushed only one step and effects a shutter releasing when it is pushed two steps.

As can be understood from the above discussion, according to the present invention, the automatic focussing mechanism can be driven not only by the actuation of the camera switch circuit 6 on the camera body but also by the actuation of the external actuation switch S2 on the lens barrel. This means that even when the switch S2 is accidentally pushed, the electrical power can be supplied to the driving motor and the focussing detecting device, which results in an increase of power consumption. However, the increase of the power consumption can be prevented by making the main switches S1 and S3 OFF. That is, when the main switch S1 is turned OFF, no power can be supplied to the driving motor M, even if the switch circuit 6 and the external actuation switch S2 are turned ON. Therefore, no increase of battery consumption occurs. Furthermore, so long as the main switch S3 maintains ON, the focus detecting device 1 operates, so that when the switch circuit 6 or the external actuation switch S2 is turned ON, the focussing state can be detected, for examply, by actuating a focus indicator in a finder of the camera.

FIG. 3 shows a second embodiment of the present invention. The difference between the first and second embodiments resides in that external actuation switches S2 on the lens barrel in FIG. 3 include only power supply switch for feeding the power to the driving motor and that a semi-conductor switch circuit 7 is provided in FIG. 3 which is turned ON to operate the focus detecting device 1 when the power supply switch is turned ON. Components in FIG. 3 corresponding to those in FIGS. 1 and 2 are designated by the same numerals as those in FIGS. 1 and 2.

In FIG. 3, the external actuation switches S2 are adapted to feed a predetermined battery voltage to the motor driving and reversing circuit 3 in order to drive the motor M. The switches S2 are connected to the control circuit 4 of the revolution speed of the motor M, to which circuit 4 is also connected the main switch S1. The semi-conductor switch circuit 7 is turned ON to operate the focus detecting device 1 by way of the camera switch circuit 6, when the switches S2 are turned ON.

Figure 4:
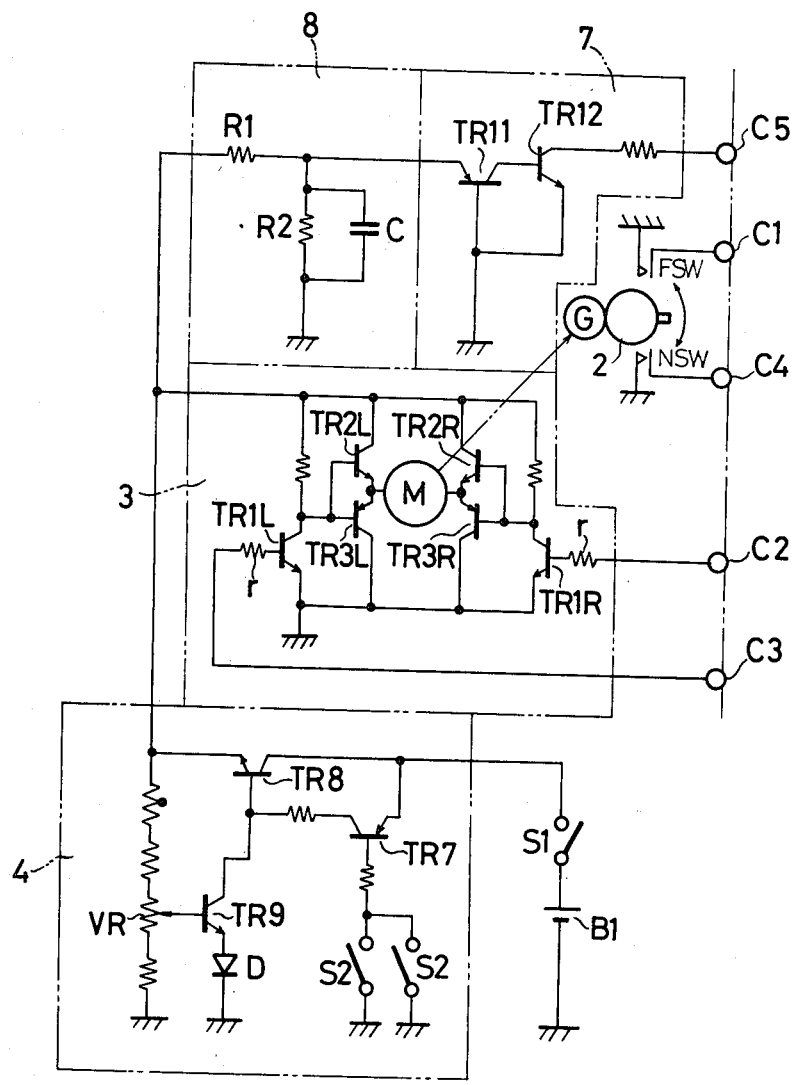
FIGS. 4 and 5 show different examples of a motor driving and reversing circuit, a circuit for controlling the number of revolution of a motor, a semi-conductor switch circuit, and a camera switch circuit, shown in FIG. 3.

The semi-conductor switch circuit 7 is exemplified in FIG. 4, together with the associated circuits. The circuit 7 has two transistors TR11 and TR12. When a voltage is applied to an emitter of the transistor TR11, it is turned ON and the transistor TR12 is also turned ON. An integrating circuit 8 which includes resistors R1 and R2 and a condenser C and which is connected in series to the emitter of the transistor TR11 smoothes pulse voltages which are produced when only the main switch S1 is turned ON so that no pulse voltage is fed to the transistor TR11. Thus, even if pulses are produced, the switch circuit 7 does not operate.

In a camera according to the second embodiment, the automatic focussing can be effected by the actuation of the camera switch circuit 6, similarly to the first embodiment. When the camera switch circuit 6 on the camera body K is not actuated and when the switch S2 on the lens barrel B is turned ON, the battery voltage is applied to the motor M by way of the control circuit 4 and at the same time the semiconductor switch circuit 7 is turned ON, so that the voltage is applied to the focus detecting device 1 by means of the terminals C5 and K5 and the camera switch circuit 6. As a result, focussing can be effected, similarly to the actuation of the camera switch circuit 6.

The following technical advantages can be expected from the circuit arrangement shown in FIG. 4 (and FIG. 3). First, when the external actuation switch S2 is turned OFF and when the main switch S1 is turned ON, a pulse voltage which is substantially equal to the supply voltage of the battery B1 (and which is considerably higher than that of the transistor TR11) is produced but is smoothed by the integrating circuit 8, so that the semi-conductor switch circuit 7 does not operate, resulting in non-operation of the focus detecting device 1. That is, no mal-operation occurs. Second, since the transistor TR8 which is connected in series to the main switch S1 can be turned ON and OFF by the external actuation switch S2, a large amount of current necessary for driving the motor M is not given to the switch S2 and, accordingly the occurrence of noise due to leads existing in the lens barrel can be prevented and contact members are able to become smaller. In addition, since the potential of the switch S2 at its low potential side is identical to the potential of the main switch S1 at its low potential side and is also equal to the potential of the mount flange surfaces Kf and Bf, the switches and the power supplies can be simplified.

As can be seen from the above description, the embodiment illustrated in FIGS. 3 and 4 includes no switches S2(2) in FIGS. 1 and 2 and in place thereof has the integrating circuit 8 which prevents a mal-operation of the switch circuit 7 which tends to occur due to the removal of the switches S2(2) when the main switch S1 is turned ON and OFF.

In the embodiment illustrated in FIG. 4, the transistor TR8 which is connected in series to the main switch S1 on the lens barrel can be made ON and OFF by the external actuation switch (power supply switch) S2.

Figure 5:
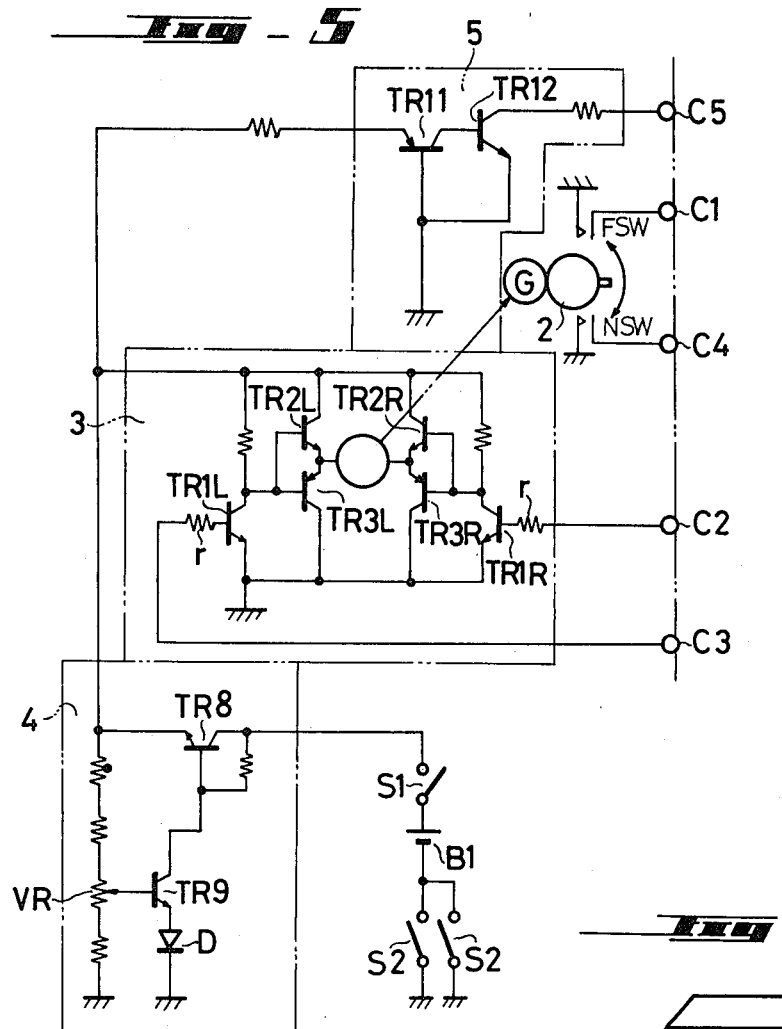

Alternatively, it is also possible to connect the switches S1 and S2 in series. Such an alternative is shown in FIG. 5 in which no integrating circuit for smoothing a pulse voltage is provided since no pulse voltage occurs even when the main switch S1 is turned ON while the power supply switch S2 is kept OFF.

FIGS. 6–12 show an example of an internal construction of a camera with an interchangeable lens, according to the present invention. The camera body K has, at its lower portion, the focus detecting device 1 and the battery B2. The focus detecting device 1 receives a light reflected from an auxiliary mirror 9S attached to a mirror 9. The terminals K1–K5 are located at a predetermined space on the mount flange surface Kf. The main switch S3 and the switch circuit 6 which is associated with the shutter release button are provided in the camera but are not illustrated.

Figure 6:
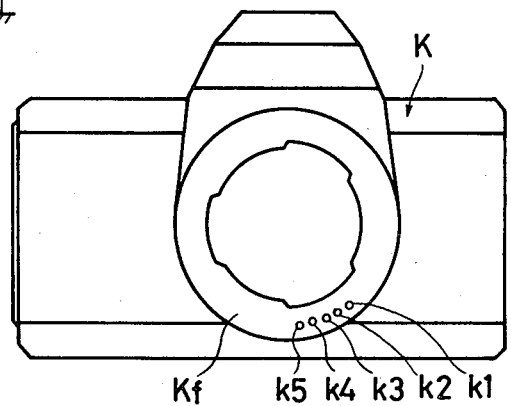
Figure 9:
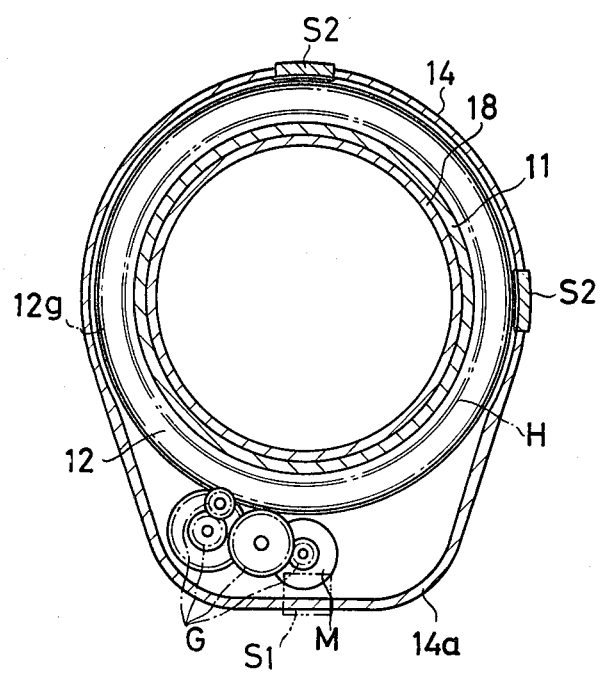
FIGS. 9 and 10 are sectional views taken along the lines IX—IX and X—X in FIGS. 6 and 7, respectively.

FIGS. 6 and 7 show a zoom lens system including two groups of lenses, provided on the lens barrel B. The lenses are located at the longest focal length position and the shortest focal length position in FIGS. 6 and 7, respectively.

A mount securing barrel 11 has a mount which can be connected to a mount of a camera body K. A zooming barrel 14 is movably supported on the stationary barrel, i.e., the mount securing lens barrel 11 so that the zooming barrel can slide on the stationary barrel only in directions of the focal axis. In other words, the zooming barrel is a non-rotating member. In the zooming barrel 14 is screwed a front lens barrel 12 carrying a group of front lenses which are focussing lenses, by means of a helicoid H. The zooming barrel 14 has a lower ridged portion 14a integral therewith, in which a driving motor M and a gear mechanism (gear train) G which is rotated by the driving motor M are arranged. The gear train G has a terminal output gear which is engaged by a peripheral gear 12g on the front lens barrel 12. The width of the gear 12g is such that the gear 12g always engages with the terminal output gear even when the front lens barrel moves in the focal axis direction to focus the focussing lens means.

In front portion of the ridged portion 14a, is provided a circuit chamber R in which the motor driving and reversing circuit 3 and other circuits on the lens barrel are arranged. The battery B1 of the driving motor M is arranged in the rear end of the ridged portion 14a. The main switch S1 of the battery B1 is located at the front end of the ridged portion 14a and projects downwards, so that it can be manually actuated from outside.

A rear lens barrel 13 which carries a group of rear lenses is slidably fitted in a driving barrel 18 which is rotated at its fixed axial position in accordance with the axial displacement of the zooming barrel 14 without moving in the optical axis direction. The rotation of the driving barrel 18 causes the rear lens barrel 13 to move in the axial direction while preventing the rear lens barrel from rotating by the stationary lens barrel 11. The displacement of the rear lens barrel 13 has a predetermined relationship to the axial displacement of the front lens barrel 12, so that the focal length of the front and rear lenses varies.

In the zooming barrel 14 is rotatably supported a distance ring 15 which has an axial groove extending parallel to the focal axis. The front lens barrel 12 has a projection 12P which is fitted in the axial groove so that the front lens barrel rotates together with the distance ring 15. On the outer periphery of the distance ring 15 is provided an indicating portion 15P of a scale of the object distance, which scale is visible through a window opening 14W formed in the zooming barrel 14.

On the outer periphery of the zooming barrel 14 are provided two spaced external actuation switches (buttons) S2 which are biased outwards by proper spring means (not shown). The inward movement of the button S2 causes the switches S2(1) and S2(2) in a circuit shown in FIGS. 1 and 2 to be simultaneously closed, or the switches S2 in FIGS. 3-5 to be closed.

The external actuation switches S2 are provided on the upper portion of the zooming barrel 14 and on one side, preferably on the right hand side of the zooming barrel 14 when viewed from front, in view of a biotechnology. The provision of the actuation switches on the zooming barrel makes it possible to easily push the switches during a zooming operation.

Figure 11:
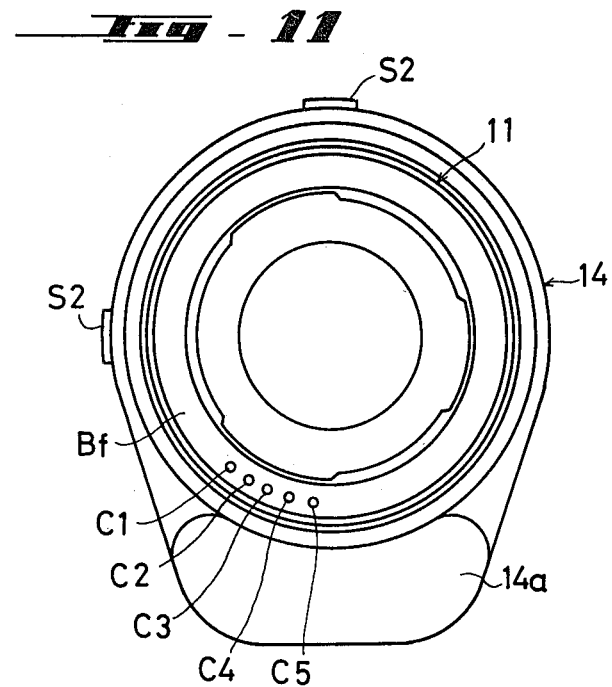
FIG. 11 is a back view of FIG. 8.
Figure 12:
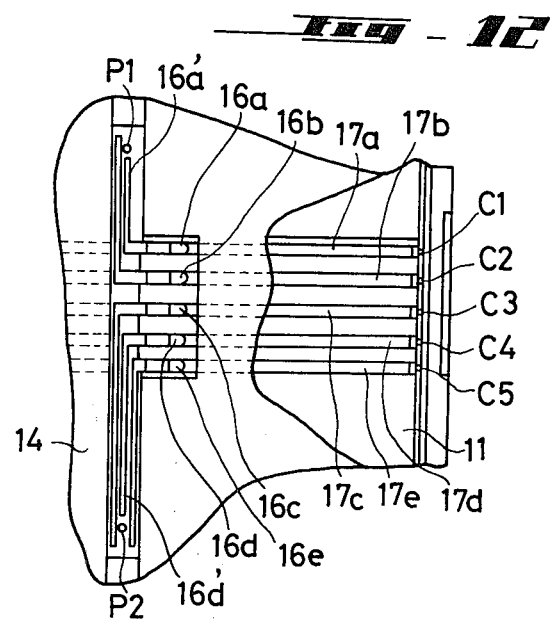
FIG. 12 is a developed view of sliding contacts between a mount securing barrel and a zooming barrel, vied from the direction designated by an arrow XII in FIG. 10.

In order to achieve the transmission and reception of signals between the stationary barrel 11, the driving motor M of the zooming barrel 14 which axially moves, and the various kinds of circuits mentioned above, brushes 16a, 16b, 16c, 16d and 16e are secured to and insulated from the zooming barrel 14, and lead plates 17a, 17b, 17c, 17d and 17e which come into contact with the brushes 16a–16e, respectively are secured to and insulated from the stationary barrel 11. The lead plates 17a–17e have elongated band plate extending in the direction of the focal axis so that the lead plates are always in contact with the corresponding brushes of the zooming barrel 14 which moves in the axial direction, as shown in FIGS. 6, 7 and 12. The lead plates 17a–17e are connected, at their rear ends, to connector pins C1, C2, C3, C4 and C5 which are provided on and insulated from a mount flange surface Bf of the stationary barrel 11, respectively, as shown in FIGS. 11 and 12.

The connector pins C1–C5 are connected to corresponding connector pins K1–K5 on a mount surface of the camera body K respectively, when the lens barrel is attached to the camera body K by means of the mount (FIG. 5) of the lens barrel and the mount of the camera body K, as shown in FIG. 1 or 3. The connector pins C2 and C3 which are connected to the connector pins K2 and K3 of the camera body K are adapted to receive signals from the focus detecting device 1 on the camera body K and to transmit the signals to the bridge circuit 3 of the driving motor M, through the lead plates 17b and 17c, and the brushes 16b and 16c, respectively. On the other hand, the connector pins C1 and C4 are adapted to give signals which represent the front terminal position and the rear terminal position of the front lens barrel 12 which moves to focus the front lenses, to the focus detecting device 1.

Figure 10:
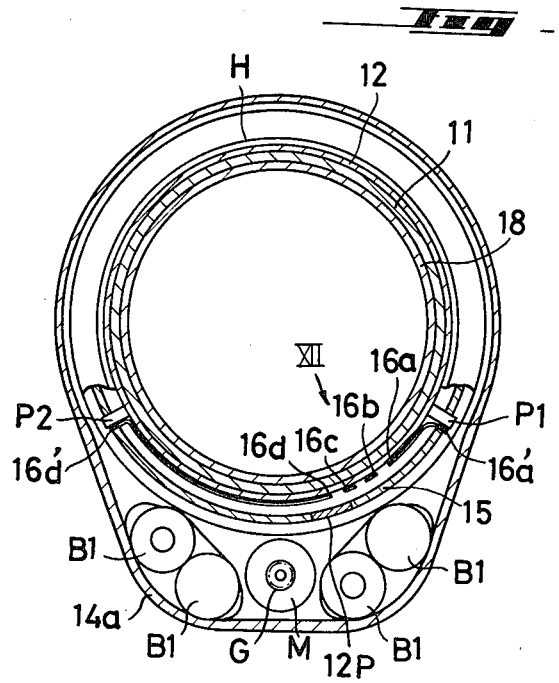

As shown in FIGS. 10 and 12, on the zooming barrel 14 are provided projecting pins P1 and P2 which are engaged by the projection 12P to limit the rotational movement of the front lens barrel and which are electrically connected to the zooming barrel 14. The brushes 16a and 16d have legs 16a' and 16d' extending therefrom which are opposed to and normally spaced from the corresponding pins P1 and P2 at a small distance, so that the pins P1 and P2 are normally not in contact with the legs 16a' and 16d'. When the front lens barrel 12 is rotated, the projection 12P comes into engagement with one of the pins P1 and P2, so that the projection 12P pushes the leg 16a' or 16d' of the brush 16a or 16d to cause the leg 16a' or 16d' to come into contact with the pin P1 or P2. Thus, the front lens barrel 12 which is located at the infinite object distance or at the shortest object distance can be detected. An infinite object distance detecting switch FSW which comprises the pin P1 and the brush 16a and a shortest object distance detecting switch NSW which comprises the pin P2 and the brush 16d are thus provided in the lens barrel, as shown in FIGS. 1 and 3.

In the above mentioned camera, when either the camera switch circuit 6 (FIGS. 1, 3) or the external actuation switch S2 is made ON, the focus detecting device 1 and the driving motor M are driven to axially move the front lens barrel 12 which forms the focussing lens means to the focal point.

When the front lens barrel 12 is moved to, the infinite object distance position (rear terminal position) or the shortest object distance position (front terminal position), the infinite object distance detecting switch FSW or the shortest object distance detecting switch NSW detects the movement of the front lens barrel to feed a signal to the focus detecting device 1 through the connector pins C1 and K1 or C4 and K4.

The focus detecting device 1 gives a control signal to the motor driving and reversing circuit 3, in accordance with the input signal. That is, for example, when the camera switch circuit 6 or the external actuation switch S2 is actuated to photograph an object which is located at a short distance, and when the focussing lens means of the lens barrel is located at the infinite object distance, a control signal is fed to the motor driving and reversing circuit 3 so that the driving motor causes the focussing lens means 2 and accordingly the front lens barrel 12 to be automatically rotated toward a finite object distance. Alternatively, in case where the focussing lens means is located at the shortest object distance position, and when the switch circuit 6 or the switch S2 is actuated to photograph an object which is located at a shorter distance, the driving motor M is not driven and an indicator in the finder indicates that the object is out of a predetermined range of the object distance in which the object can be photographed. When the object is located within the range, a control signal is fed to the driving motor to move the focussing lens means toward the infinite object distance position. The feed back of the output of the device detecting the displacement of the focussing lens means, to the camera body makes it possible to control the driving motor M in an optimum way.

The focussing operation is effected also for the zooming barrel 14 which is located between positions shown in FIGS. 6 and 7, in the same way as mentioned above. That is, since the sliding contact terminal assembly consisting of the brushes 16a–16e and the lead plates 17a–17e is always kept at a contact position in which the brushes are connected to the lead plates, independently of the axial position of the zooming barrel 14, it is ensured that the transmitting and receiving operation of the control signals between the focus detecting device 1, the motor driving and reversing circuit 3 and the detecting device of the displacement of the focussing lens means can be effected.

When the present invention is applied to an optical lens system, such as a telephoto lens or a wide-angle lens, other than a zoom lens, the optical lens system is considered to be entirely a focussing lens means. Therefore, in this consideration, the front lens barrel 12 and the rear lens barrel 13 are integrally connected to each other so as to provide a lens barrel assembly, and the zooming barrel 14, the driving barrel 18 and the mount securing barrel 11 are integrally interconnected so as to provide a barrel assembly. The lens barrel assembly is engaged in the barrel assembly by means of a helicoid H. In addition, the brushes 16a–16e and the lead plates 17a–17e are integrally interconnected. The external actuation buttons S2 may be provided on the stationary barrel 1. By this modification, the present invention is applicable to an optical lens system other than a zooming lens.

In the illustrated embodiment, the signal transmitting an receiving means are provided on the mount flange surfaces of the camera body K and the lens barrel B, and accordingly, a focussing circuit between the camera body and the lens barrel can be automatically completed when the lens barrel is mounted to the camera body. The signal transmitting and receiving means, such as terminals, connector pins or lead plates can be provided not only on the mount flange surfaces but also on any surfaces of the lens barrel and the camera body that are opposed to each other when the lens barrel is mounted to the camera body.

The "mount" referred to herein includes not only existing mounts in a conventional camera but also mount surfaces which are specially provided on the camera body and the lens barrel to put the signal transmitting and receiving means, on the mount surfaces.

The invention has been described in detail with particular reference to preferred embodiments thereof, but it will be understood that variations and modifications can be effected without changing the basic scope of the invention as described herein above.

We claim:

1. An automatic focus camera with an interchangeable lens, comprising an interchangeable lens barrel having focussing lens means movable in directions of the optical axis of the camera, and a camera body having a focus detecting device which detects an image of an object formed by the focussing lens means, said lens barrel having a driving motor for axially moving the focussing lens means in accordance with a detection signal of the focus detecting device, wherein the improvement comprises a switch circuit means on the camera body for actuating the focus detecting device and the driving motor, and an external actuation switch on the lens barrel for actuating the focus detecting device and the driving motor, independently of the actuation of the switch circuit means on the camera body.

2. An automatic focus camera according to claim 1, further comprising a mount securing lens barrel having a mount which can be attached to a mount of the camera body.

3. An automatic focus camera according to claim 2, further comprising means for transmitting and receiving signals between the focus detecting device of the camera body, the switch circuit means, the driving motor of the focussing lens means and the external actuation switch, provided on the mounts of the camera body and of the lens barrel, said signal transmitting and receiving means being connected to each other when the mount of the lens barrel is attached to the mount of the camera body.

4. An automatic focus camera according to claim 3, further comprising a zooming barrel which can be axially displaced with respect to the mount securing lens barrel, said zooming barrel supporting the focussing lens means, the driving motor, and the external actuation switch.

5. An automatic focus camera according to claim 4, further comprising a plurality of slide contacts provided on the zooming barrel and the mount securing barrel, for causing the driving motor and the external actuation switch of the zooming barrel to be always electrically in contact with the signal transmitting and receiving means on the mount securing barrel, independently of the axial position of the zooming barrel.

6. An automatic focus camera according to claim 1, wherein the external actuation switch comprises a power supply switch element of the driving motor and an actuation switch element of the focus detecting device, mechanically associated with the power supply switch element so that the actuation switch element is turned ON and OFF simultaneously with the power supply switch element.

7. An automatic focus camera according to claim 6, wherein said actuation switch element of the focus detecting device causes the focus detecting device to be operated by way of the switch circuit of the camera body.

8. An automatic focus camera according to claim 1, 2 or 3, wherein said lens barrel is provided thereon with a battery for the driving motor, and a main switch for connecting and disconnecting the battery and the external actuation switch.

9. An automatic focus camera according to any one of claims 1-7, wherein two external actuation switches are provided on the upper portion and one side of the lens barrel when viewed from front, respectively.

10. An automatic focus camera according to any one of claims 1-7, wherein the switch circuit means of the camera body is associated with and actuated by a shutter release button of the camera.

11. An automatic focus camera with an interchangeable lens, comprising an interchangeable lens barrel having focussing lens means movable in directions of the optical axis of the camera, and a camera body having a focus detecting device which detects an image of an object formed by the focussing lens means, said lens barrel having a driving motor for axially moving the focussing lens means in accordance with a detection signal of the focus detecting device, wherein the improvement comprises a switch circuit means on the camera body for actuating the focus detecting device and the driving motor, an external actuation switch on the lens barrel for feeding the supply voltage to the driving motor and a semi-conductor switch circuit on the lens barrel which is operated when the external actuation switch is turned ON to actuating the focus detecting device.

12. An automatic focus camera according to claim 11, further comprising a mount securing lens barrel having a mount which can be attached to a mount of the camera body.

13. An automatic focus camera according to claim 12, further comprising means for transmitting and receiving signals between the focus detecting device of the camera body, the switch circuit means, the driving motor of the focussing lens means, the external actuation switch and the semi-conductor switch circuit, provided on the mounts of the camera body and of the lens barrel, said signal transmitting and receiving means being connected to each other when the mount of the lens barrel is attached to the mount of the camera body.

14. An automatic focus camera according to claim 13, further comprising a zooming barrel which can be axially displaced with respect to the mount securing lens barrel, said zooming barrel supporting the focussing lens means, the driving motor, the external actuation switch and the semi-conductor switch element.

15. An automatic focus camera according to claim 14, further comprising a plurality of slide contacts provided on the zooming barrel and the mount securing barrel, for causing the driving motor, the external actuation switch and the semi-conductor switch circuit of the zooming barrel to be always electrically in contact with the signal transmitting and receiving means on the mount securing barrel, independently of the axial position of the zooming barrel.

16. An automatic focus camera according to claim 11, further comprising a main switch which is connected in series to the external actuation switch.

17. An automatic focus camera according to claim 11, further comprising a circuit for smoothing a pulse voltage which is produced when the main switch of the camera is turned ON.

18. An automatic focus camera according to any one of claims 11-16, wherein two external actuation switches are provided on the upper portion and one side of the lens barrel when viewed from front, respectively.

19. An automatic focus camera according to any one of claims 11-16, wherein the switch circuit means of the camera body is associated with and actuated by a shutter release button of the camera.

* * * * *